Sept. 6, 1960      I. SKOLNICK      2,951,415
GAGE FOR FISH NETS
Filed Dec. 8, 1958
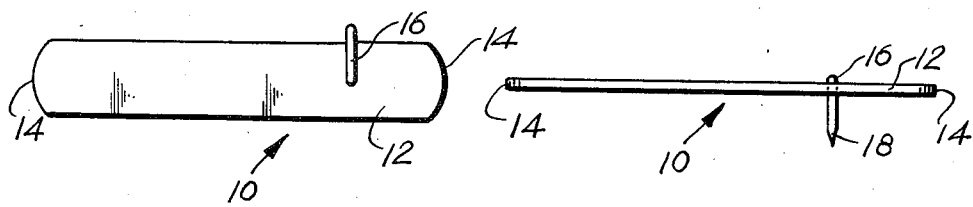
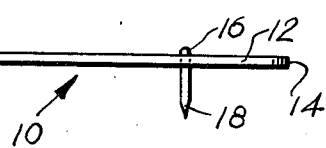
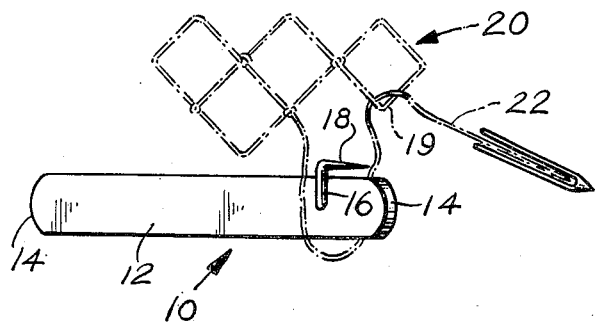
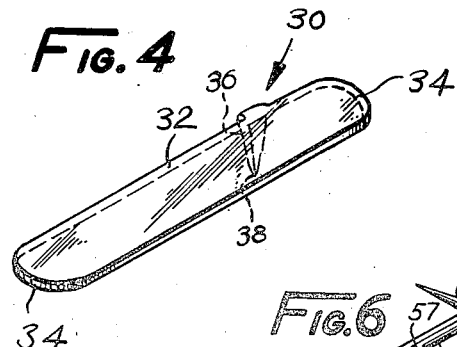
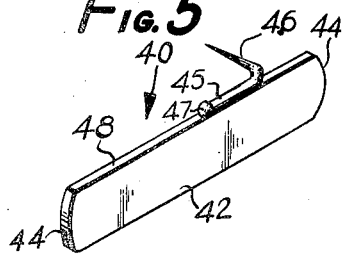
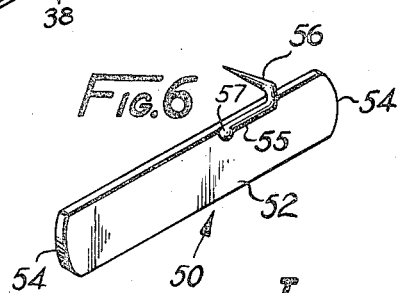
INVENTOR.
ISAAC SKOLNICK
Joseph B. Lindecker
ATT'Y.

2,951,415
GAGE FOR FISH NETS

Isaac Skolnick, 2852 W. 27th St., Brooklyn, N.Y.

Filed Dec. 8, 1958, Ser. No. 778,940

3 Claims. (Cl. 87—53)

This invention relates to nets and more particularly to a gage for facilitating the manufacture thereof.

It is an object of the present invention to provide an improved gage for fabricating fish nets that will enable the various net strands to be knotted in a simple and efficient manner.

Another object of the present invention is to provide an improved gage for fish nets of the above type that will substantially eliminate mistakes in the manufacture of such nets, eliminate the necessity of having to pinch the knotted portions of the net with the fingers, and which will increase the speed of making such nets.

Other objects of the invention are to provide an improved gage for fish nets bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of an improved gage for fish nets made in accordance with one form of the present invention;

Figure 2 is a bottom plan view of the device in Figure 1;

Figure 3 is a perspective view of the gage illustrated in Figures 1 and 2 in operative use;

Figure 4 is a perspective view of a slightly modified form of construction;

Figure 5 is a perspective view of another modified form of construction; and

Figure 6 is a perspective view of still another modified form of construction.

Referring now more in detail to the drawing and more particularly to Figures 1 to 3 thereof, an improved gage 10 for fish nets made in accordance with one form of the present invention is shown to include an elongated flat rigid plate 12 which, is provided with arcuate end portions 14 at both extremities thereof. A hook element 16 in the form of a spring-like L-shaped finger is provided with one leg thereof integrally secured to one side of the flat rigid plate 12, such as by welding. The outer free end of the other leg of this L-shaped finger is provided with a pointed portion 18 which engages within the bight of a net square 19 of a net 20 being fabricated so as to automatically maintain the bight portion of that segment of the net and to control the length of the cord 22 being used to form another net segment by the tying of a knot within such bight portion. The pointed element assures the construction of a proper knot and the main body portion 12 of the gage automatically controls the size of the newly formed net segment.

In Figure 4 of the drawing a modified form of construction 30 is shown wherein an elongated flat rigid plate 32 is similarly formed with rounded ends 34 but is provided with an outwardly struck tab 36 instead of a separate element integrally secured to a side of the main body member. This outwardly struck tab 36 has a pointed portion 38 at its outermost free end which functions in a manner similar to that of the pointed portion 18 hereinbefore described in connection with the embodiment shown in Figures 1 to 3 of the drawing.

In Figure 5 of the drawing a modified form of construction 40 is shown wherein an elongated flat rigid plate 42 is similarly formed with rounded ends 44 but is provided with a hook element in the form of a crankshaped finger 45 having a conically pointed end 46, and spherical ball end 47, the finger being fixedly secured to edge 48.

In Figure 6 another modified form of construction 50 is shown wherein plate 52 having rounded ends 54, hook element 55 with a conically pointed end 56 and a ball end 57 is fixed secured to the plate 52.

The pointed elements in the aforementioned modifications function the same as those herein described in Figures 1 to 4 of the drawing.

All of the parts of the improved gage are preferably constructed of a spring-like material so as to prevent permanent distortion thereof and to enable such gage to be readily manipulated during the making of the net.

While various changes may be made in the detailed construction, it shall be understood that such changes shall be within the spirit and scope of the present invention as defined by the appended claims.

What I claim as new and desire to protect by Letters Patent of the United States is:

1. An improved gage for use in making fish nets with square openings, the cord being drawn around the gage in a manner whereby the width of the body portion of the gage controls the size of the square opening, comprising, in combination, an elongated, relatively thin and narrow flat strip of material of substantially uniform width and thickness, the material of said strip being metallic, said strip formed with rounded ends, a hook element integrally secured to one side of said elongated flat strip adjacent one end thereof, said hook element being of L-shape configuration, one leg of said hook element being welded to said one side of said flat strip, the other leg of said hook element having a pointed end portion extending in a direction normal to the plane of said elongated flat strip, whereby said hook element engages within the bight of the square opening of the net being fabricated to maintain the bight portion of that segment of the net and control the length of the cord being used to form the net.

2. An improved gage for fish nets comprising, in combination, an elongated flat rigid plate, a hook element integral with one side of said elongated flat rigid plate adjacent one end thereof, said hook element being a spring-like L-shaped finger, one leg of said L-shaped finger being secured to one side of said elongated flat plate, and the other leg of said L-shaped finger extending in a direction normal to the plane of said elongated flat plate.

3. The combination according to claim 1, wherein the outer end portion of said other leg of said L-shaped hook element embodies a pointed free end.

References Cited in the file of this patent
UNITED STATES PATENTS

| 1,245,161 | Opperman | Nov. 6, 1917 |
| 1,318,465 | Seifarth | Oct. 14, 1919 |
| 1,705,860 | Hagihara | Mar. 19, 1929 |

FOREIGN PATENTS

| 48,513 | Sweden | Feb. 9, 1921 |